United States Patent [19]

Vogel et al.

[11] Patent Number: 4,750,041
[45] Date of Patent: Jun. 7, 1988

[54] APPARATUS FOR MERGED FIELD OPERATION OF AN IMAGE SENSOR IN A STILL VIDEO CAMERA

[75] Inventors: Richard M. Vogel, Henrietta; Mitchell J. Milton, Webster; Thomas C. Nutting, Fairport, all of N.Y.

[73] Assignee: Eastman Kodak Company, Rochester, N.Y.

[21] Appl. No.: 96,814

[22] Filed: Sep. 10, 1987

Related U.S. Application Data

[63] Continuation-in-part of Ser. No. 898,968, Aug. 21, 1986, abandoned.

[30] Foreign Application Priority Data

Aug. 10, 1987 [WO] PCT Int'l Appl. .................. PCT/US87/01901

[51] Int. Cl.$^4$ ............................................. H04N 3/15
[52] U.S. Cl. ............................ 358/213.22; 358/909; 358/213.13
[58] Field of Search ..................... 358/213.13, 213.19, 358/213.22, 213.28, 213.29, 909

[56] References Cited

U.S. PATENT DOCUMENTS

| | | |
|---|---|---|
| 4,470,076 | 9/1984 | Arai et al. ............................ 358/213 |
| 4,475,125 | 10/1984 | Lesser et al. ......................... 358/213 |
| 4,486,783 | 12/1984 | Tanaka et al. ........................ 358/213 |
| 4,499,496 | 2/1985 | Tanaka et al. ........................ 358/213 |
| 4,499,497 | 2/1985 | Levine ................................. 358/213 |
| 4,514,766 | 4/1985 | Koike et al. .......................... 358/213 |
| 4,539,597 | 9/1985 | Kinoshita et al. ..................... 358/213 |
| 4,551,758 | 11/1985 | Masunaga et al. .................... 358/213 |
| 4,603,354 | 6/1986 | Hashimoto .......................... 358/213 |
| 4,663,669 | 5/1987 | Kinoshita et al. ............... 358/213.19 |

OTHER PUBLICATIONS

"Field Integration Mode CCD Color TV Camera Using a Frequency Interleaving Method," Takagawa et al., IEEE Trans. on Coms. Elec., vol. CE-29, No. 3, Aug. 1983, pp. 358-364.

Primary Examiner—Jin F. Ng
Assistant Examiner—Stephen Brinich
Attorney, Agent, or Firm—David M. Woods

[57] ABSTRACT

A driving circuit (30) generates multi-phase signals for operating the vertical charge-coupled registers (V1, V2 . . . ) of an interline-transfer image sensor (12). Though having full-frame still capability, the sensor (12) is included in a still video camera for single-field recording. After a still exposure is completed, the phase signals (XV1 . . . XV4) applied to the vertical registers generate an array of charge wells in the registers alongside the photoelectric elements (P1, P2) corresponding to each field. The image charges residing in these elements transfer to the registers as separate fields, where they are merged as one field in order to increase the photosensitivity for a single-field still recording. Such increased photosensitivity is translated into increased photographic range by controlling the exposure of the sensor (12) to accord with the increased image charge by, for example, reducing the exposure time provided by the sensor or the optical aperture presented to the image sensor. In this manner, the "speed" of the sensor is increased for merged field operation.

7 Claims, 9 Drawing Sheets

| G | R | G | R | G | R | → n
|---|---|---|---|---|---|
| G | R | G | R | G | R | → n + 263
| G | B | G | B | G | B | → n + 1
| G | B | G | B | G | B | → n + 264
| G | R | G | R | G | R | → n + 3
| G | R | G | R | G | R | → n + 265

FIG. 8

APPARATUS FOR MERGED FIELD OPERATION OF AN IMAGE SENSOR IN A STILL VIDEO CAMERA

CROSS-REFERENCE TO RELATED APPLICATIONS

This is a continuation-in-part of application Ser. No. 898,968, filed Aug. 21, 1986, now abandoned.

This application is related to (1) copending patent application Ser. No. 882,121, entitled "Asynchronous Still Timing for a Video Camera Producing Movie or Still Images", filed on July 3, 1986, in the name of R. Vogel and (2) copending patent application Ser. No. 880,461, entitled "Exposure Control Apparatus For a Still Video Camera Having an Electronic Viewfinder", filed on June 30, 1986 in the name of T. Nutting and R. Shroyer.

BACKGROUND OF THE INVENTION

1. Field of the Invention

The present invention relates to the field of still video imaging, and especially to the operation of an image sensor in a camera capable of producing a single-field recording.

2. Description Relative to the Prior Art

A new video recording format has been introduced in which a small flexible magnetic disk is used to store up to 50 still video pictures. This format provides the option of storing a full frame (two circular tracks per picture) for 25 pictures, or a single field (one circular track per picture) for 50 pictures. Though single field recording inevitably limits playback resolution compared to full-frame recording, a satisfactory "full-frame" result can be played back by interpolating a second field from successive lines of the recorded (first) field. U.S. Pat. No. 4,470,076 illustrates such interpolation with a still image obtained from a limited-resolution, single-field image sensor. The principal attractiveness of single field recording is the higher picture density obtained on the recorded disk. Nonetheless, frame recording provides an inherently better result. A versatile video camera would therefore offer the user both capabilities: frame and field recording.

Frame recording requires that color information regarding both fields be simultaneously generated within an image sensor capable of separately resolving, and outputting, each field. Without simultaneously-generated fields, any movement between fields would provide an unsightly image. Since the aforementioned still format provides line sequential color, each line of the image sensor must separately provide the necessary primary color signals (R, G or B) for generating a line sequential color difference (R−Y or B−Y). A typical sensor of this type employs an interline-transfer technique. In such a sensor, photo-generated charges stored in the odd horizontal lines are read out for the odd video field, while the other line charges are read out for the even field. Such sensor operation can be compared with a video (movie) operating method called "frame integration", in which photo-generated electrons in each photoelectric element are accumulated for one television frame time, i.e., 1/30 second in the NTSC system. In a still video camera, however, the photo-generated electrons in each photoelectric element are accumulated for a variable period dependent upon the required still exposure.

Significantly, line charges must be maintained distinct so that one field is unaffected by charges from the other field. In this way, the fields are temporarily separable though they have been concurrently integrated. (Another movie mode, referred to as "field integration", requires the addition of line charges in two adjacent lines in order to generate the primary color signals. Field integration is unsuitable for full-frame still imaging because it depends on a successive generation of two fields to provide a frame. In other words, each field "uses up" all the charge accumulated by the sensor and the sensor must be re-exposed for the second field. For a discussion of both field and frame integration, see "Field Integration Mode CCD Color Television Camera Using a Frequency Interleaving Method", by Koshinori Takizawa et al, *IEEE Trans. on Consumer Electronics*, Vol. CE-29, No. 3, August 1983, pp. 358-364.)

In a still video camera having a full-frame interline-transfer image sensor with concurrent field integration, the provision for single field recording uses only half of the photoelectric elements of the sensor. Drawing an analogy to conventional photographic film, the effective "resolution" of the sensor is reduced accordingly. With film, however, resolution can be traded for "film speed", that is, lowering resolution ordinarily leads to an increase in photosensitivity. This does not happen with an electronic sensor operating in a field mode because the light sensitivity of the sensor is dependent upon half the photoelectric elements in half the area of the sensor. No benefit in "speed" is obtained.

U.S. Pat. No. 4,603,354 discloses an electronic camera having an image sensor operable in either a still frame mode or a still field mode, in both cases using each field. Odd and even fields are produced and read out separately in the frame mode. The field mode, on the other hand, provides a "merged" output by the addition of the information charges of both fields. For the merged field, the information charge put out by the image sensor is double that put out for each field in the frame mode—each image location has twice as much charge. As a result, since the information charge in the frame and merged field modes is different, either attenuating or amplifying means are provided for adjusting the level of the signal from the image sensor. In this way, the two modes provide equal output. This level adjustment, however, provides two unattractive alternatives: either increase the gain of the frame signal, thereby adding noise to the supposedly "high quality" signal, or decrease the gain of the merged field signal, thereby reducing effective photosensitivity in the potentially "high speed" signal.

Disclosure of Invention

Instead of trying to extend photographic range in merged field operation by modifying the level of the signal from the image sensor, it turns out that modifying the exposure of the image sensor provides greater range without having to trade noise for sensitivity. A conventional interline-transfer sensor can thus be adapted for either full frame or merged field use in a still camera without requiring level changes in the signal output from the sensor. In merged field operation, a field is output from the sensor at, for instance, double the output level compared to full-frame operation under the same exposure. This happens because all the image charge is collected in one field. Knowing this, the light exposure of the sensor is adjusted in the merged field operational mode to take advantage of the additional "sensitivity". For instance, either the optical aperture or the exposure time of the sensor is reduced, which has the effect of extending low light scene capability for the same output as in full-frame operation. Then the picture signal is recorded. Considering that the field is replicated, or interpolated, during payback (to obtain the second field), the effect is to double the "speed" of the sensor compared to full-frame operation.

BRIEF DESCRIPTION OF THE DRAWINGS

The invention will be described with reference to the drawings, in which:

FIG. 3(A and B) is a rendition of the block diagram of FIG. 1 in further detail;

DESCRIPTION OF THE PREFERRED EMBODIMENT

Because video cameras and video cameras employing interline-transfer image sensors are well known, the present description will be directed in particular to elements forming part of, or cooperating more directly with, apparatus in accordance with the present invention. Elements not specifically shown or described herein may be selected from those known in the art.

Figure 1:
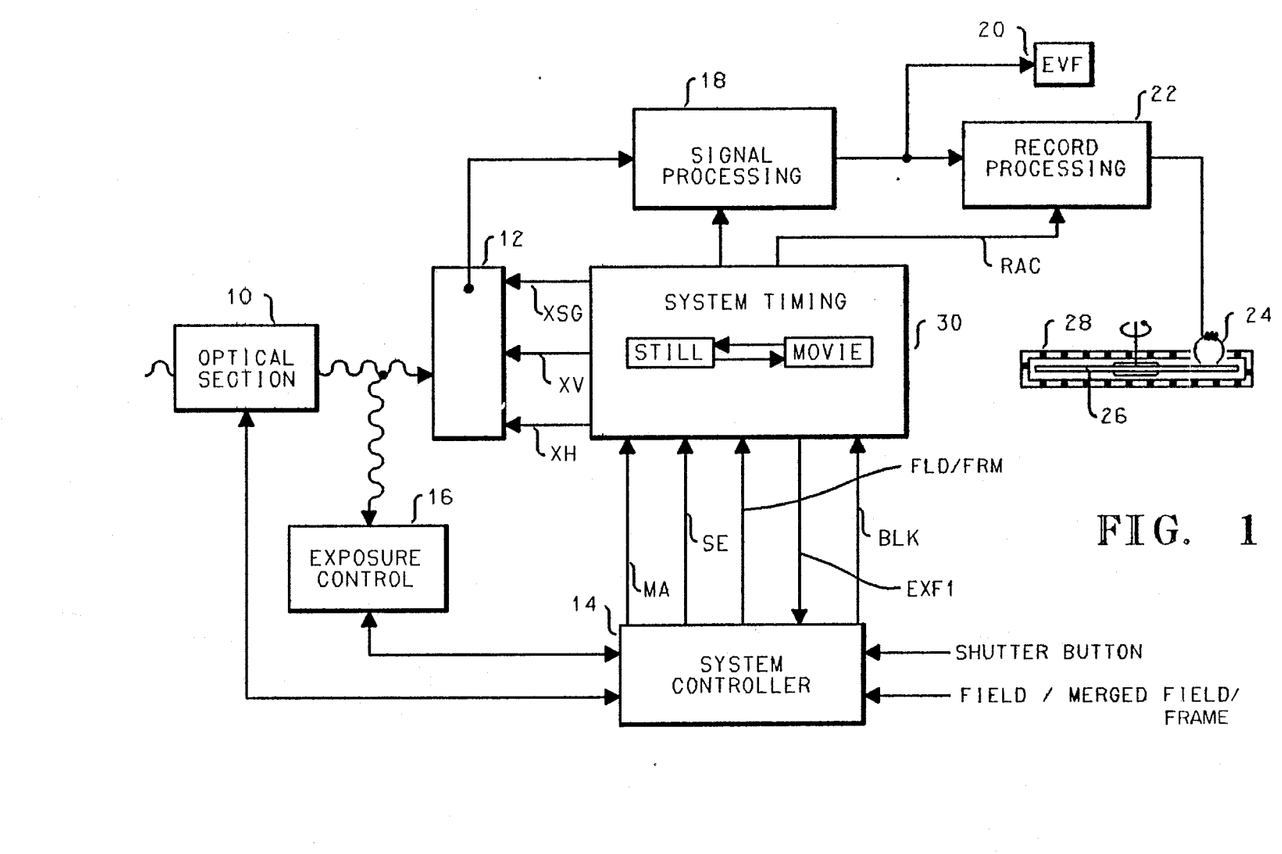
FIG. 1 is a block diagram of a still video camera incorporating merged field operation according to the invention.

Referring initially to FIG. 1, the pertinent sections of a still video camera are shown for purposes of describing the invention: An optical section 10 directs image light to an image sensor 12, which in its preferred form is a conventional solid-state, interline-transfer image sensor. The basic elements of a conventional interline-transfer image sensor are shown schematically in an abbreviated form in FIG. 2. Briefly, the light gathered by the optical section 10 causes charge to collect in an array of photosites (photoelectric elements) disposed in rows and columns on a semiconductor substrate. A plurality of photosites P1 are disposed in rows and columns for generating a pattern of electrical signals corresponding to a first video field; likewise, a second plurality of photosites P2 generate signals corresponding to a second video field. A group of imager driving signals (XSG, XV and XH) determine the operation of the sensor—in the case of a charge-coupled device, certain of these signals (XV and XH) prescribe a phase-related control of charge movement, hence the term phasing signals.

Figure 2:
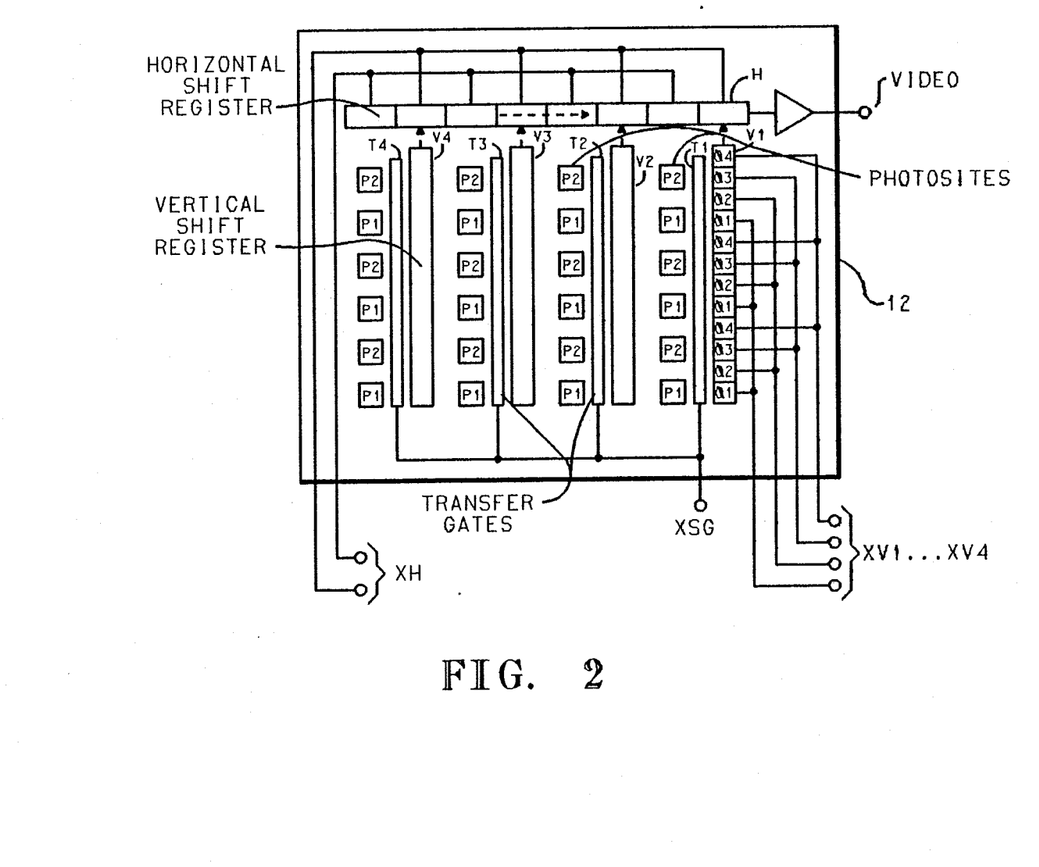
FIG. 2 is an illustration of a conventional interline-transfer image sensor used in the camera of FIG. 1.

When the transfer gate signal XSG is low, the image charges that have collected in a selected plurality (field) of photosites transfer through a set of transfer gates $T_1 \ldots T_4$ to a corresponding set of vertical charge-coupled (CCD) shift registers $V_1 \ldots V_4$. Each vertical shift register is divided into a repetitive series of phase sections $\phi 1 \ldots \phi 4$. A set of vertical phasing signals $XV1 \ldots XV4$ are applied to respective phase sections $\phi 1 \ldots \phi 4$ to transfer the charges to a horizontal CCD shift register H, from which they are transferred off the image sensor by a horizontal phasing signal XH. Vertical and horizontal transfers are accomplished by biasing the registers with the respective phasing signals to form an array of independent potential wells, which are then shifted by varying the bias levels of the phasing signals in tandem. The selection of a particular field is obtained by biasing the vertical registers $V1 \ldots V4$ such that a potential well appears at a phase section $\phi 1$ (field 1) or $\phi 3$ (field 2) when the transfer gates $T1 \ldots T4$ are opened.

Referring back to FIG. 1, a system controller 14, preferably a microprocessor, controls the general operation of the camera, including the optical section 10 and an exposure control circuit 16. A video signal generated by the image sensor 12 is converted into a line sequential color signal by a signal processing section 18. A monochrome rendition of the signal is displayed upon an electronic viewfinder 20 and, at the appropriate time, the color signal is prepared for recording in a record processing section 22. The recording signal is applied to a recording head 24 and recorded upon a magnetic disk 26. The disk 26 is mounted for rotation within a cartridge housing 28, which has an opening that allows the recording head 24 to contact the disk 26 for recording a plurality of concentric tracks (which correspond to a plurality of images). A timing circuit 30 synchronizes the signal processing section 18, the record processing signal 22, and the viewfinder 20, with the image sensor 12. In particular, the timing circuit 30 produces the transfer gate signal XSG, and the phasing signals $XV1 \ldots XV4$ and XH.

A number of additional signals are shown in FIG. 1, as follows: A moving aperture signal MA (from the controller 14 to the timing circuit 30) signifies that a shutter button has been pressed for a still exposure and that the optical aperture presented to incoming light is being adjusted by the optical section 10. A start exposure signal SE (from the controller 14 to the timing circuit 30) follows the signal MA and signifies that the aperture is correctly established and a still exposure can begin. An expose field signal EXF1 (from the timing circuit 30 to the controller 14) then indicates that the still exposure indeed has begun. A blanking signal BLK (from the controller 14 to the timing circuit 30) controls the blanking of the electronic viewfinder 20. The recording period is regulated by a record activate signal RAC (from the timing circuit 30 to the record processing section 22). Each of these signals will be further described in connection with FIGS. 3 and 4.

Merged field operation of the still video camera of FIG. 1 involves, as will be described, the summing of image charges residing in the first plurality of photosites P1 with the image charges residing in the second plurality of photosites P2. Since both fields of image charge are initially present on the image sensor shown by FIG. 2, the camera can be operated in either a conventional single-field or dual-field (full frame) mode, as well as the merged field mode that is the subject of this invention. A special input line is provided to the system controller 14 for selecting the mode of operation. The specification of frame or field recording is signified by the state of a signal FLD/FRM applied to the timing circuit 30.

Figure 3A:
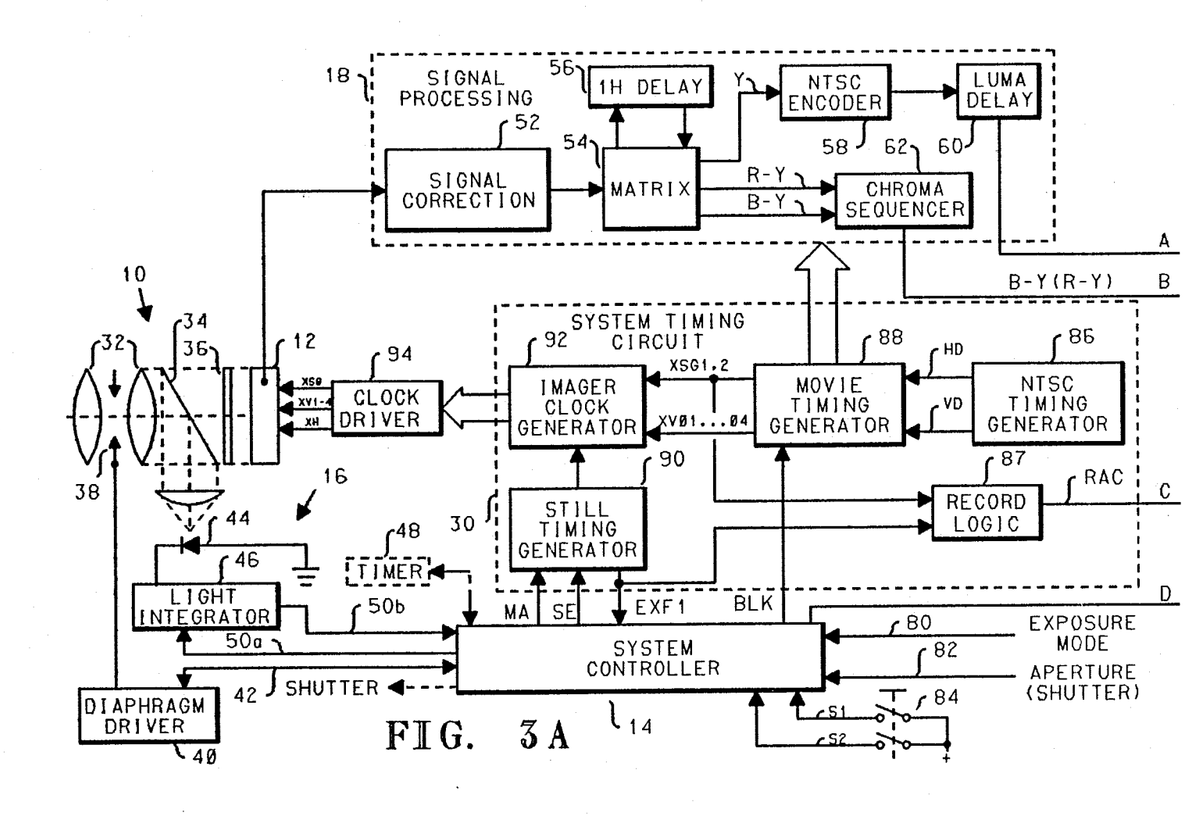
Figure 3B:
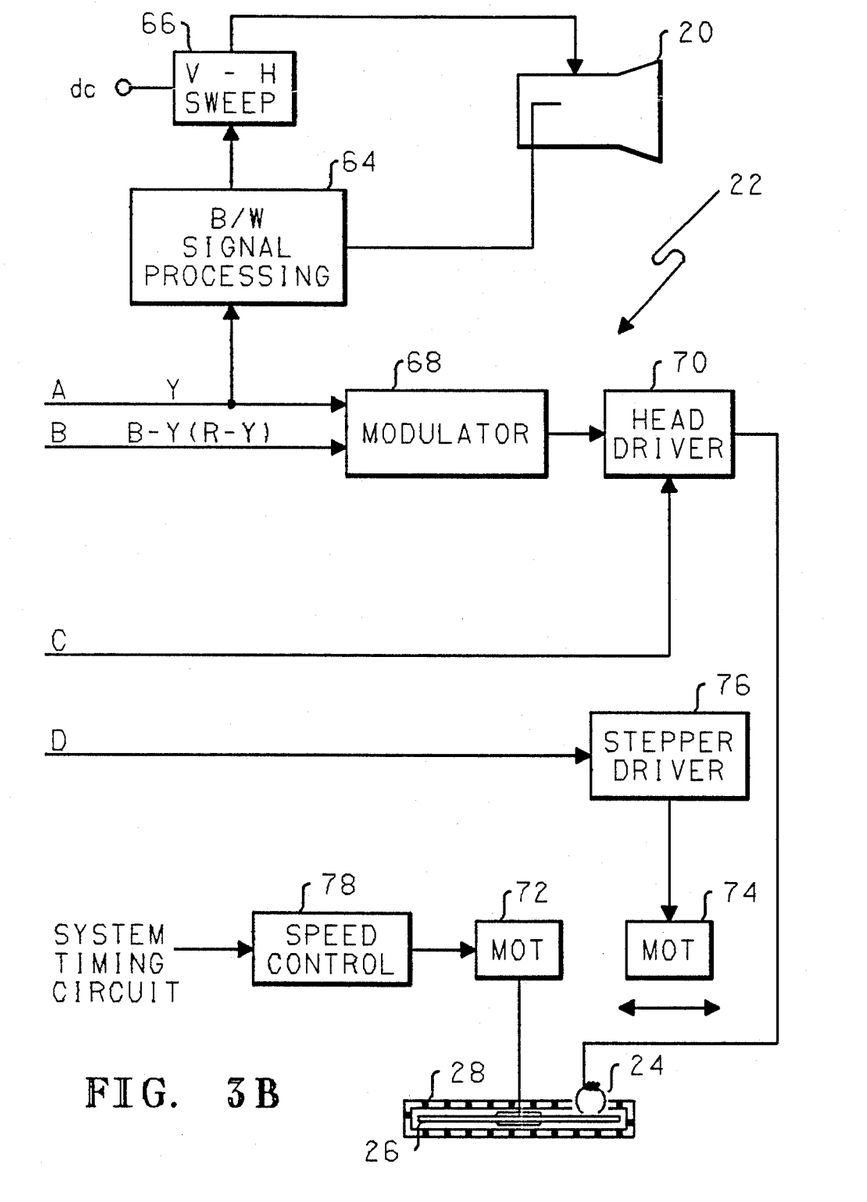

While not shown in detail in FIG. 1, full frame operation involves either moving the head 24 from one track to the next for recording both fields, or the provision of a dual head structure for recording both fields sequentially without head movement. FIG. 3, which shows the presently preferred embodiment, is devoted to merged field operation and, as such, may either represent a camera that provides only merged field recording or that part of a full-featured camera devoted to merged field recording. In any case, single-field (unmerged) operation and dual-field (full frame) operation are conventional techniques that will not be further addressed. The mode selection and FLD/FRM signals are thus not shown as separate inputs to the controller 14 and timing circuit 30 in FIG. 3.

Figure 8:
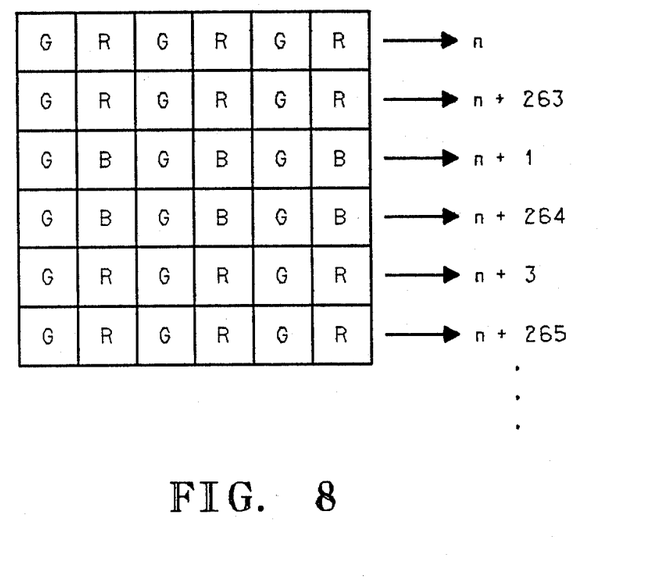
FIG. 8 is a diagram of a section of a known color mosaic filter used in connection with an imager sensor operated according to the invention.

Referring to FIG. 3A, the optical section 10 includes a lens system 32 for directing image light from an object (not shown) to the image sensor 12 through a partially transmissive mirror 34 and a color filter 36. The color mosaic structure of the filter 36 may be any kind that affords completely separate fields... that is, each field has all the color information necessary for its own set of color primaries. A section of a suitable, and presently preferred, color mosaic is shown in FIG. 8, together with the lines represented by each row. (In movie operation, such a color mosaic is typical of a "frame integration mode" color filter.) Returning to FIG. 3A, a diaphragm 38 regulates the optical aperture (through which image light passes) by a linkage with a diaphragm driver 40. The system controller 14 and the driver 40 communicate with one another on a line 42 when the aperture is to be changed. The optical section 10 also interacts with the exposure control circuit 16, which receives a sample of image light diverted by the mirror 34. The exposure control circuit 16, which employs an integration cycle in its exposure determination process, includes a photodiode 44 and a light integrating circuit 46 that cooperate with a timing procedure (shown by a broken-line box 48) in the system controller 14 to arrive at a brightness value of the incoming image light. The appropriate aperture setting of the diaphragm 38 for either the full-frame or merged field mode is determined from the brightness value. The light integrator 46 is enabled by the system controller 14 on a line 50a; when the integration cycle is complete, a signal is returned to the controller 14 on a line 50b. A description of this integration cycle can be found in further detail in copending cross-referenced application (2), Ser. No. 880,461.

The video signal generated by the image sensor 12 (by application of the aforementioned signals XSG, XV1 ... XV4 and XH) is maintained nominally the same (for the same image light) regardless of operational mode by either reducing the aperture setting of the diaphragm 38 or by shortening the exposure time of the image sensor 12 during merged field operation. Whichever mode is in use, the video signal is applied to a signal correction circuit 52, which performs a sample and hold operation and applies gain, white balance and gamma corrections to the signal. The color signal is applied to a matrix 54, which, in combination with a set 56 of 1H delay lines, produces a luminance (Y) signal, and a pair of color difference signals (B−Y, R−Y). The luminance signal is applied to a NTSC encoder 58 and a luma delay stage 60, the latter mainly to account for subsequent color delays in the modulation process. Meanwhile the color difference signals are put in line sequence by a chroma sequencer 62. The luminance signal is tapped at this point (see FIG. 3B) and directed through a monochrome (B/W) signal processing circuit 64 to the electronic viewfinder 20 (which is a conventional monochrome display). The viewfinder display is controlled by conventional vertical and horizontal sweep circuits 66.

The luminance signal and the color difference signals are input to a modulator 68, which provides a selected preemphasis to the input signals and frequency modulates a suitable set of carriers with the preemphasized signals. When permitted by the condition of the record activate signal RAC from the system timing circuit 30, the modulated signal is amplified by a head driver circuit 70 and applied to the recording head 24. The recording portion of the camera includes a disk drive motor 72 for rotating the magnetic disk 26 adjacent the recording head 24. The head 24 is moved by a stepper motor 74 that is connected to a stepper driver circuit 76 controlled from the system controller 14. The disk drive motor 72 is operated at a constant speed by a speed control circuit 78 coupled to the timing circuit 30.

The system timing circuit 30 and the system controller 14 are mutually adapted for two modes of operation: a movie mode for previewing the actual scene and a still mode for recording a still rendition of the scene. In the movie mode, the exposure time is fixed and the aperture is set to a value determined by the exposure control circuit 16 and the system controller 14. In the still mode, on the other hand, both exposure time and aperture may be varied. One of several conventional exposure modes is selected by designating a unique input to the system controller 14 on a line 80 for the type of mode: for example, aperture-preferred, shutter-preferred, manual, and one or more conventional program modes for emphasizing action photos, for emphasizing depth-of-field, for compromising somewhere between the two preceding modes, and so on. Depending on the exposure mode in use, the exposure time and/or aperture value are manually entered to the system controller 14 on line(s) 82. The movie mode is initiated by partially depressing a two-position shutter button 84 to its first position, thereby setting a signal $S_1$ high. The still mode is subsequently selected when the shutter button 84 is fully depressed to its second position and an exposure release signal $S_2$ is set high.

The system control circuit 30 has a free-running circuit component in the form of a NTSC timing generator 86 and a movie timing generator 88, and an intermittently-operated component in the form of a still timing generator 90. The NTSC generator 86 provides a horizontal drive signal HD and a vertical drive signal VD according to NTSC standards. The movie timing generator 88 keys upon the drive signals from the NTSC timing generator 86 and generates a set of transfer gate signals XSG1 and XSG2 for the respective fields of a television frame and a set of four vertical register phasing signals $XV\phi 1 \ldots XV\phi 4$ for operating the vertical registers of the image sensor according to NTSC timing. The movie timing generator 88 also provides the timing for the signal processing circuit 18, including sample and hold pulses for the signal correction section 52, clamping levels, and so on.

An imager clock generator 92 receives input signals from either the movie timing generator 88 or the still timing generator 90 and applies its output to a clock driver 94, which provides the phasing signals XSG, XV1 ... XV4 and XH to the image sensor 12. The clock generator 92 serves, in the movie mode, as a conduit for the vertical phasing signals $XV\phi1 \ldots XV\phi4$ by transferring them directly to the clock driver 94 (where they become the signals $XV1 \ldots XV4$) and, in the still mode, as a generator of the still timing that defines the still exposure sequence. The field transfer gate signals XSG1 and XSG2 are combined in an OR function by the imager clock generator 92 and, in the movie mode, applied to the clock driver 94 as the transfer gate signal XSG seen in connection with FIG. 2. In the still mode, the XSG signal is independently generated in a preliminary sequence to clear the image sensor 12 of extraneous charge and then to define the still exposure period. Though the XSG signal is shown in FIGS. 1, 2, 3A and subsequent Figures as being separately applied to the transfer gates of the image sensor 12, the XSG signal may instead be carried on the vertical phasing signals that drive the vertical registers, thus dispensing with a separate transfer gate. In the preferred embodiment the XSG signal is presented as a higher than usual bias level on one of the vertical phasing signals (XV1 or XV3) at the moment a transfer is called for; the result . . . the transfer of image charge to the vertical registers . . . is the same for either technique. The timing interrelationship of the still mode and the movie mode is shown in greater detail in the cross-referenced application (1), Ser. No. 882,121.

Figure 4:
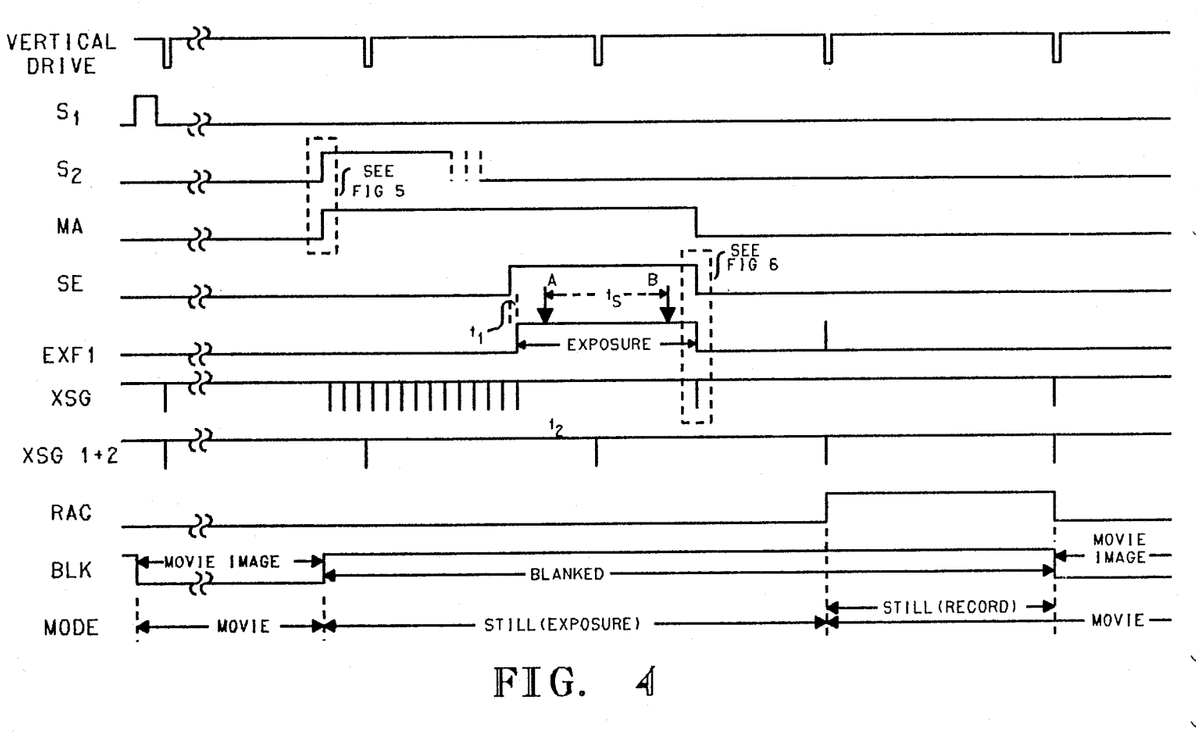
FIG. 4 is a timing diagram describing signal conditions during the operation of the camera shown by FIG. 3.

Referring to FIG. 4 in connection with FIGS. 3A and 3B, when the movie mode is initiated by setting the signal $S_1$ high, the blanking signal BLK from the system controller 14 to the movie timing generator 88 is set low. The movie timing generator 88 accordingly permits the signal processing circuit 18 to pass a video signal to the viewfinder 20. In the movie mode, the timing circuit 30 produces the vertical transfer gate signal XSG for opening the transfer gates of the image sensor according to the vertical drive frequency. Vertical register phasing signals $XV1 \ldots XV4$ and horizontal register phasing signals XH (not shown in FIG. 4) remove the video signal from the image sensor within each field period, applying it to the signal processing section 18 to generate a conventional monochrome video movie display in the viewfinder 20.

Figure 5:
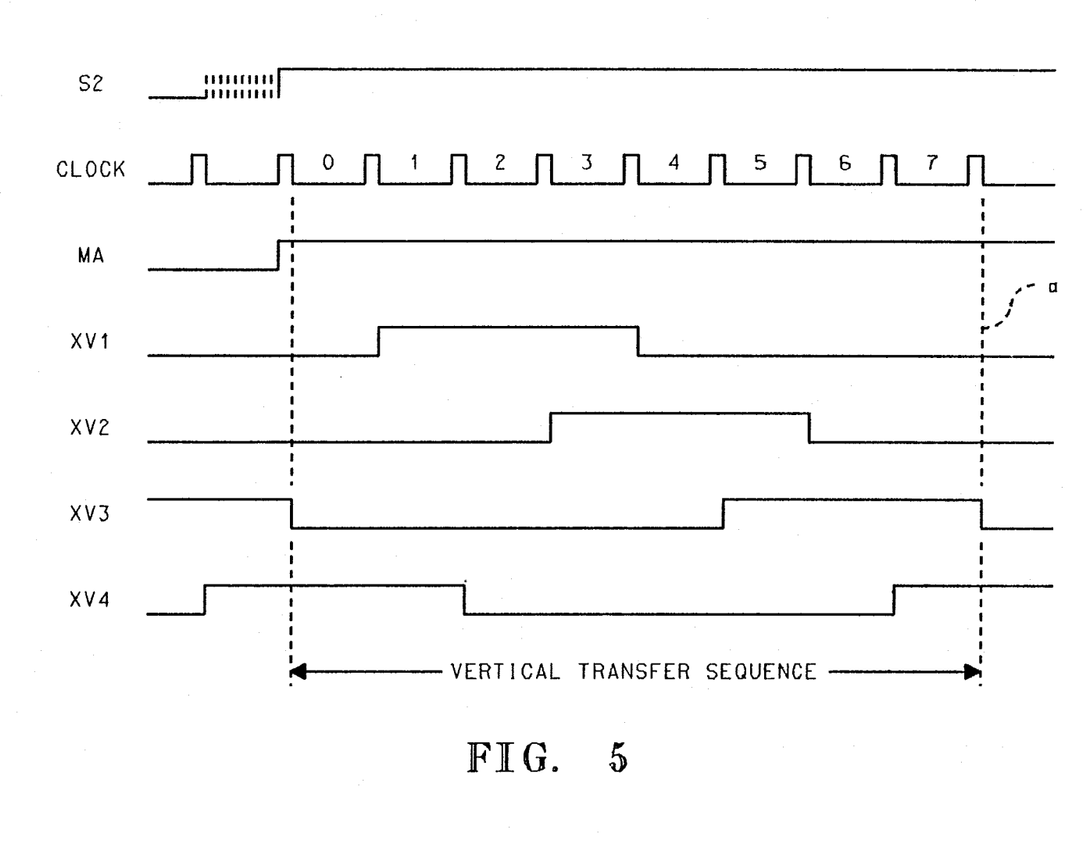
FIG. 5 is a detailed expansion of the beginning of still mode timing as shown by FIG. 4.

The vertical drive signal shown in FIG. 4 determines the video rate for the movie mode of operation. The still mode of operation can be seen from the subsequent waveforms as an interruption of the movie video rate; in particular, both a preliminary sequence of aperture adjustment/sensor clearing and the actual still exposure can be commenced without regard to the vertical drive signal. The still mode is instead initiated in relation to the clock period governing the phase signals $XV1 \ldots XV4$. This clock signal is seen in FIG. 5 as a separate signal that determines the edge transitions of the phasing signals $XV1 \ldots XV4$. The vertical transfer sequence (the time for a potential well to move through the four phase sections $\phi1 \ldots \phi4$ of a vertical register) is thus related to a sequence of clock periods. The signal MA, which begins the still mode sequence, is only recognized on the next transition of the clock signal after the still release $S_2$ has been triggered.

Referring again to FIG. 4, with the onset of the signal MA, the signal BLK is set high and the movie timing generator 88 accordingly directs the signal processing circuit 18 to clamp its output signal to a black level. This effectively blanks the viewfinder 20. The system controller 14 issues signals on the line 42 to move the diaphragm to its still aperture value, which was predetermined by operation of the exposure control circuit 16. In the meantime the still timing generator 90 has interrupted the imager clock generator 92 and has initiated a rapid-fire sequence of XSG pulses to the transfer gates of the image sensor 12 to clear the photosites of extraneous unwanted charge. From there the charge is cleared by rapid operation of the vertical and horizontal registers. In this connection, the vertical phasing signals $XV1 \ldots XV4$ shown by FIG. 5 begin a rapid sequence in which each full clearing sequence lasts 1 millisecond. When the aperture is set, a start exposure signal SE is sent to the timing circuit 30 to indicate that an exposure should commence.

Depending on when the signal XSG is last pulsed low during the repetitive fast clearing sequence, a short time interval $t_1$ elapses before the next clearing sequence is completed following receipt of the signal SE. This time ranges from one clock cycle to a full clearing sequence (1 millisecond). The time interval $t_1$ terminates with the system timing circuit 30 momentarily dropping the gate signal XSG low one more time to open the image sensor transfer gates. As soon as the transfer gates are closed (XSG is high), the image sensor photosites (both P1 and P2) immediately begin to collect charge from the incident image light and the still exposure period begins. Simultaneously, the timing circuit 30 notifies the system controller 14 with the expose field signal EXF1 that the still exposure has begun. Since there is non-image charge residing in the vertical registers, the phasing signals $XV1 \ldots XV4$ are sequenced one more time (at the fast rate) until the vertical registers are fully cleared. The states of the phasing signals $XV1 \ldots XV4$ then remain in the conditions shown to the right of the broken line (a) of FIG. 5.

During the pre-exposure clearing sequence the signal on the line 50a is set low so that the exposure circuit 16 does not operate. At the instant the expose field signal EXF1 goes high, the signal on the line 50a likewise goes high, thereby beginning the still exposure control integration cycle in synchronism with the still image exposure cycle. When the still exposure cycle is completed, the signal on the line 50b changes state, thus notifying the system controller 14 that the exposure should end. The system controller 14 then notifies the timing circuit 30 that the exposure should end by driving the start exposure signal SE low. (The signal MA is also brought low at this time.)

Figure 6:
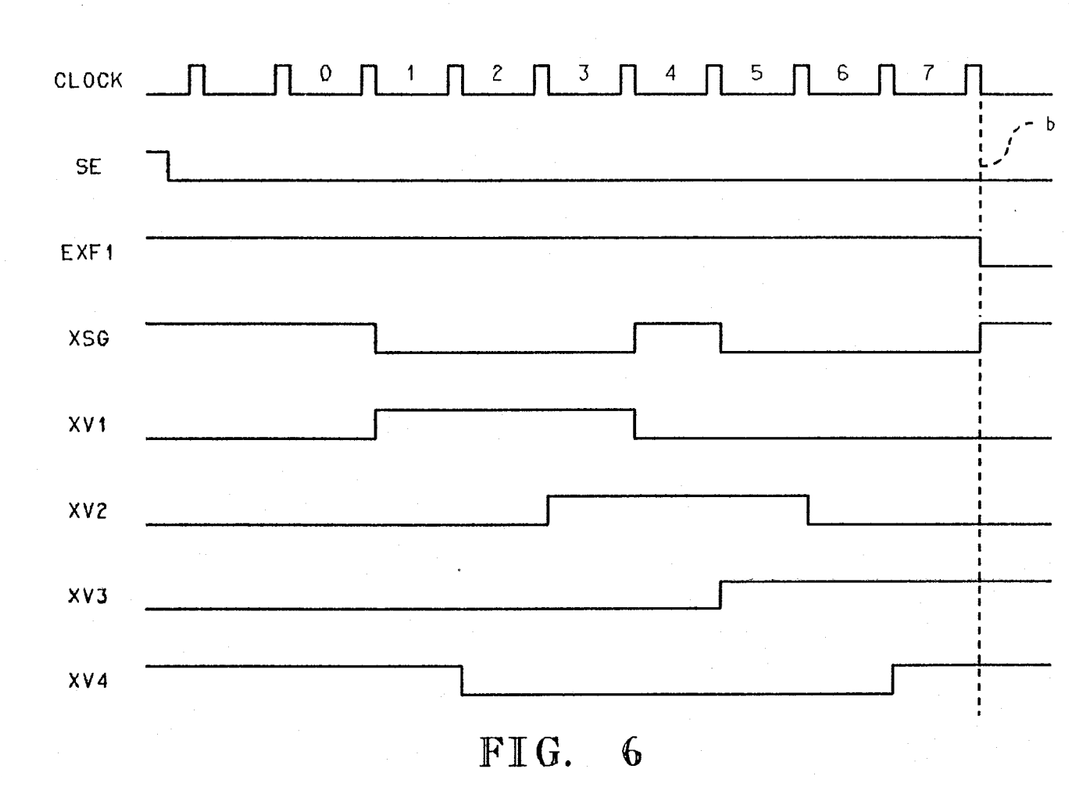
FIG. 6 is a detailed expansion of the end of the still exposure period as shown by FIG. 4.

The transfer gate signal XSG (whether alone or carried by a vertical phasing signal) regulates the transfer of integrated image charge from the photosites to the vertical registers. Since the vertical registers in a conventional interline-transfer device are light-protected by an opaque coating, the image charge is light-protected once it is transferred and the still exposure is terminated. As shown by FIG. 6, the transfer of the image charge into the vertical registers occurs in relation to a transfer sequence of the phasing signals $XV1 \ldots XV4$ (which have been static since the last field of extraneous charge was dumped after the still exposure was started). When the transfer gate signal XSG is pulsed low in conjunction with the low state of the phasing signal XV1 (which is applied to the phase section $\phi1$) or XV3 (applied to the phase section $\phi3$) the charge residing in the photosites P1 or P2 are transferred into the vertical registers $V1 \ldots V4$. According to the diagram of FIG. 6, this is done first in connection with the charges in the photosites P2. The tandem pulsations of the phasing signals $XV1 \ldots XV4$ then move the trapped charge into the phase sections $\phi1$. The gate signal XSG is again pulsed low, but now in conjunction with the low state of the phasing signal XV1, and the trapped charge is joined by the charge from the plurality of photosites P1. In this manner the two charge patterns are merged to form a combined field, thereby utilizing the full photosensitivity of the image sensor for one field. Since the charge residing in the photosites P1 can be transferred within a very short time after the transfer of charge residing in the photosites P2 (for example, within 30 microseconds), the additional exposure effect upon the later-transferred field is minimal.

Figure 7:
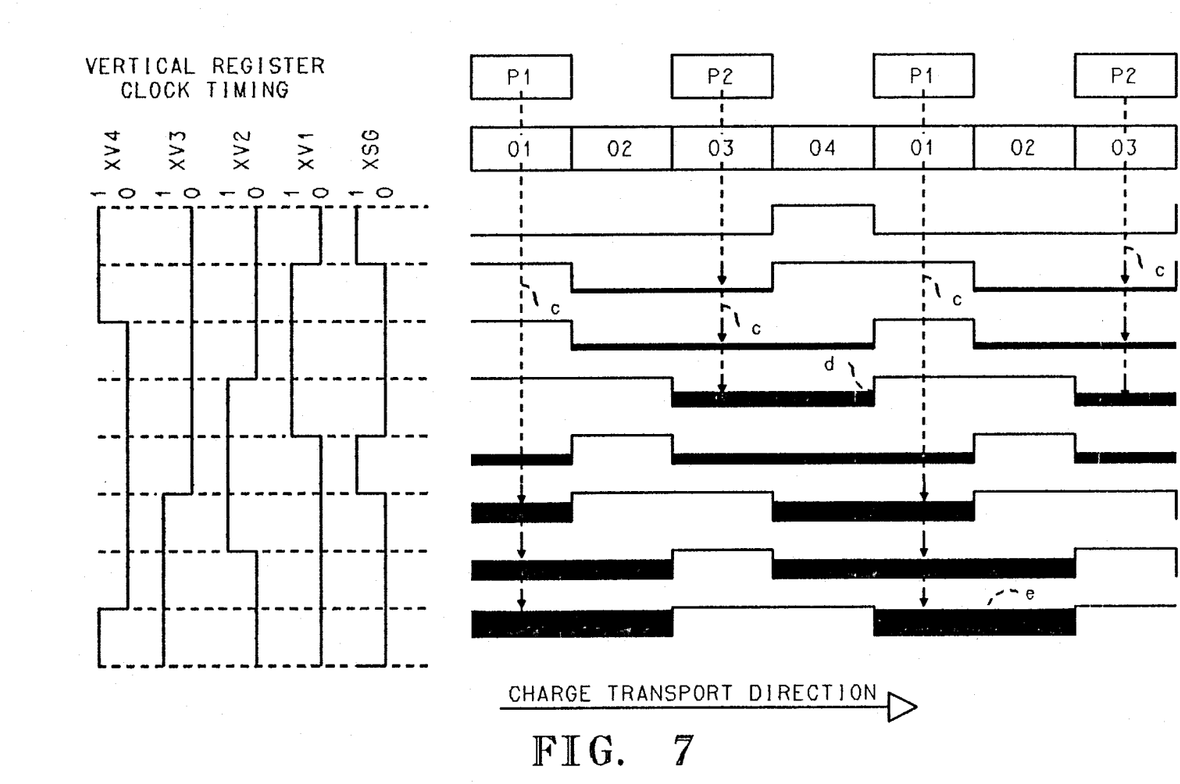
FIG. 7 is a composite diagram showing some of the timing waveforms of the image sensor and the corresponding charge transfers that produce a merged field according to the invention.

The merging of the charges in the two fields is further shown by the combined timing and transport diagram of FIG. 7. The vertical phasing signals XV1 . . . XV4 and the transfer gate signal XSG are shown along the left edge. Field one and field two photosites (P1 and P2) are shown alongside the respective phase sections of a portion of the vertical register V1. The diagrams below the vertical register phase sections $\phi 1 \ldots \phi 4$ indicate the status of each of the register phases at each instant of the phasing signal waveforms (time proceeds vertically according to the broken lines c). A low phase level indicates a potential well—which is capable of holding charge—and a high phase level indicates a barrier—which keeps the wells separate. Charge is transferred during the time signified by the solid arrow heads on the broken lines c. For instance, a charge well is shown partially filled at d with image charge from a photosite P2. The same well is moved alongside the next adjacent photosite P1 and shown filled at e with image charge from both photosites P2 and P1.

After the two video fields are transferred, the expose field signal EXF1 drops low, indicating to the system controller 14 that the exposure is over. The vertical phasing signals XV1 . . . XV4 remain static (as shown to the right of the broken line b in FIG. 6) until the next occurrence of the XSG1 or XSG2 pulse, thus temporarily trapping the merged image charge in place on the image sensor. For this pulse (XSG1 or XSG2) the transfer gate signal XSG is inhibited since the meaningful image charge in the vertical registers must not be contaminated by residual charge that has accumulated in the photosites since the exposure ended. The transfer of control from the still mode to the movie mode takes place at this time and is shown in more detail in the cross-referenced application (1), Ser. No. 882,121. The vertical transfer clock signals $XV\phi 1 \ldots XV\phi 4$ have been temporarily interrupted by the imager clock generator 92, which substituted the timing instructions received from the still timing generator 90. When the signal XSG1 (or XSG2) is first pulsed low by the movie timing generator 88 after the signal SE has dropped low, the transfer of control is obtained, i.e., the vertical clock signals XV1 . . . XV4 are resynchronized to the clock signals $XV\phi 1 \ldots XV\phi 4$ from the movie timing generator 88.

Since the signal processing section 18 is driven by the movie timing generator 88 in either mode, the video information is clocked off the image sensor 12 and processed into a video signal by the circuits making up the section 18. Meanwhile, the concurrence of a XSG1 (or XSG2) pulse and an EXF1 pulse activates a record logic section 87 in the timing circuit 30. The record activate signal RAC is thus set high, which activates the head driver 70, and the still video signal is recorded on the magnetic disk 26. At the occurrence of the next vertical drive interval the transfer gate signal XSG resumes its movie mode of operation and a movie image is displayed on the viewfinder 20, i.e., the signal BLK is set low.

The disclosure thus far has been of an "electronically-shuttered" camera, i.e., a camera without a mechanical shutter. If a mechanical shutter is provided, it would preferably be closed at some point after initiation of the still mode and then opened during the still exposure period (when the signal EXF1 is set high). For instance, referring to the waveform for the signal EXF1 in FIG. 4, the mechanical shutter (not shown separately) would be opened during a period $t_s$, which is shown to extend in time from an arrow A to an arrow B comprising a portion of the high cycle of the signal EXF1. The exposure control circuit 16 would be accordingly keyed to the period $t_s$ so as to properly determine the exposure. Using a mechanical shutter means that the light-protected vertical registers on the image sensor 12 would not have to be used to protect the image charge. A full-frame exposure could therefore be made and, while the shutter is closed, each field could be separately clocked off the image sensor 12 (frame operation) or both fields could be merged in accordance with the invention (field operation).

The foregoing disclosure describes a still video camera that achieves the greater picture density (50 pictures per magnetic disk) associated with single field recordings without wasting half of the photoelectric charge generated for full-frame image sensing. Merging fields has the effect of concentrating all the image charge in one field, thereby increasing, even doubling, the apparent "speed" of the sensor. Ordinarily, for unchanged exposure of the sensor, merging fields has the effect of increasing, even doubling, the nominal field sequential output of the sensor. If, according to the invention, the amount of light received by the image sensor is reduced when fields are merged, the output of the sensor is maintained nominally uniform (i.e., for the same external light level) whether in the full-frame or merged field mode. This enables lower-light photography for given aperture/shutter conditions or, alternatively, less demanding aperture/shutter conditions for the same light level. For instance, the light received by the image sensor 12 during merged field operation is reduced by closing down the aperture or by shortening the shutter speed (for example, by halving one or the other). In effect, therefore, the "speed" of the sensor is increased for merged field operation because the same signal level is obtained for less sensor exposure, i.e., for a lower image light level upon the sensor. Moreover, by utilizing the vertical registers of an interline transfer register according to the invention, merged field operation is accomplished without affecting full resolution, full frame operation . . . that is, operation wherein each field of the frame is a distinct and complete entity.

The invention has been described in detail with particular reference to a presently preferred embodiment, but it will be understood that variations and modifications can be effected within the spirit and scope of the invention. For example, the camera has been especially set up to operate according to NTSC television standards, but it is clear that, with a suitable image sensor and readily implemented changes in the timing circuits, PAL or SECAM standards could be accommodated as well.

What is claimed is:

1. An electronic still camera capable of either frame or merged field modes of operation, said camera having an optical section for controlling image light directed toward an image sensor that is capable of producing an output signal corresponding to separate fields, and means for operating the sensor to produce the fields separately (frame operation) or in summed combination (merged field operation), said camera comprising:

means for selecting either frame or merged field operation;

means for adjusting the amount of image light received by the sensor according to the selected operational mode; and means responsive to said selected operational mode for recording a still video picture either as separate fields or as a single merged field.

2. A camera as claimed in claim 1 in which said optical section includes a shutter and said means for adjusting the amount of image light adjusts the exposure time provided by the shutter.

3. A camera as claimed in claim 1 in which said optical section includes a diaphragm and said means for adjusting the amount of image light adjusts the optical aperture provided by the diaphragm.

4. A camera as claimed in claim 1 in which the image sensor is operated such that its effective exposure interval may be varied and in which said means for adjusting the amount of image light adjusts said effective exposure interval provided by operation of the image sensor.

5. A camera as claimed in claim 1 in which said means for adjusting the amount of image light adjusts said image light received by the sensor so that said output signal thereof is nominally uniform for the same image light regardless of the operational mode selected.

6. A camera as claimed in claim 1 in which said means for adjusting the amount of image light includes means for determining the illumination level of the image light directed toward the sensor and means for determining an exposure time and an aperture from said illumination level.

7. A camera as claimed in claim 1 in which said adjustment of the image light is made for merged field operation.

* * * * *